(12) United States Patent
Seregin et al.

(10) Patent No.: US 9,420,280 B2
(45) Date of Patent: Aug. 16, 2016

(54) ADAPTIVE UPSAMPLING FILTERS

(71) Applicant: QUALCOMM Incorporated, San Diego, CA (US)

(72) Inventors: Vadim Seregin, San Diego, CA (US); Chengjie Tu, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 13/910,995

(22) Filed: Jun. 5, 2013

(65) Prior Publication Data

US 2013/0329782 A1 Dec. 12, 2013

Related U.S. Application Data

(60) Provisional application No. 61/657,516, filed on Jun. 8, 2012, provisional application No. 61/707,127, filed on Sep. 28, 2012.

(51) Int. Cl.
| | |
|---|---|
| *H04N 7/26* | (2006.01) |
| *H04N 19/117* | (2014.01) |
| *H04N 19/159* | (2014.01) |
| *H04N 19/172* | (2014.01) |
| *H04N 19/187* | (2014.01) |
| *H04N 19/33* | (2014.01) |

(52) U.S. Cl.
CPC ....... *H04N 19/00066* (2013.01); *H04N 19/117* (2014.11); *H04N 19/159* (2014.11); *H04N 19/172* (2014.11); *H04N 19/187* (2014.11); *H04N 19/33* (2014.11)

(58) Field of Classification Search
CPC . H04N 19/117; H04N 19/159; H04N 19/172; H04N 19/187; H04N 19/33
See application file for complete search history.

(56) References Cited

U.S. PATENT DOCUMENTS

| | | |
|---|---|---|
| 6,057,884 A | 5/2000 | Chen et al. |
| 7,876,833 B2 | 1/2011 | Segall et al. |

(Continued)

OTHER PUBLICATIONS

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.

(Continued)

*Primary Examiner* — Dave Czekaj
*Assistant Examiner* — M D Haque
(74) *Attorney, Agent, or Firm* — Knobbe Martens Olson & Bear, LLP

(57) ABSTRACT

In one embodiment, a video coder for coding video data includes a processor and a memory. The processor selects a filter set from a multiple filter sets for upsampling reference layer video data based at least on a prediction operation mode for enhanced layer video data and upsamples the reference layer video data using the selected filter set. Some of the multiple filter sets have some different filter characteristics from one another, and the upsampled reference layer video data has the same spatial resolution as the enhanced layer video data. The processor further codes the enhanced layer video data based at least on the upsampled reference layer video data and the prediction operation mode. The memory stores the upsampled reference layer video data.

33 Claims, 8 Drawing Sheets

(56) References Cited

U.S. PATENT DOCUMENTS

| | | | |
|---|---|---|---|
| 8,107,571 B2 | 1/2012 | Sullivan et al. | |
| 8,199,812 B2 | 6/2012 | Ye et al. | |
| 8,755,434 B2* | 6/2014 | Park | H04N 19/46 375/240.12 |
| 2007/0286283 A1* | 12/2007 | Yin | H04N 19/70 375/240.16 |
| 2008/0089417 A1 | 4/2008 | Bao et al. | |
| 2012/0027079 A1* | 2/2012 | Ye | H04N 19/597 375/240.02 |
| 2012/0033736 A1* | 2/2012 | Sato | G06T 9/004 375/240.16 |

OTHER PUBLICATIONS

Chen J., et al., "Description of scalable video coding technology proposal by Qualcomm (configuration 1)", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/, No. JCTVC-K0035, Oct. 2, 2012, XP030112967, pp. 1-19.

Chen J., et al., "SHVC Test Model 1 (SHM1)," JCTVC-L1007, Feb. 2013, pp. 1-42.

Dong J., et al., "Upsampling based on sampling grid information for aligned inter layer prediction," 13. JCT-C Meeting; 104. MPEG Meeting; Apr. 18, 2013-Apr. 26, 2013; Incheon; (Joint Collaborative team on video coding of ISO/IEC JTC1/SC29/WG11 and ITU-T SG.16) Retrieved from the Internet < URL: http://wftp3.itu.int/av-arch/jctvc-site/ >, No. JCTVC-M0188, Apr. 8, 2013, 9 pages, XP030114145.

International Search Report and Written Opinion—PCT/US2013/044576—ISA/EPO—Jun. 11, 2014.

Park S-W., et al., "Intra BL pred. & phase shift", 15. JVT Meeting; 72. MPEG Meeting; Busan, KR:(Joint Video Team of ISO/IEC JTC1/SC29/WG11 and ITU-T SG.16 ), No. JVT-O023r1, Apr. 16, 2005, pp. 1-16, XP030005971, ISSN: 0000-0417.

Partial International Search Report—PCT/US2013/044576—ISA/EPO—Mar. 18, 2014.

Xiong L., "AHG Report: Enhancement Slice complexity reduction", 17. JVT Meeting; 74, MPEG Meeting; Oct. 14, 2005-Oct. 21, 2005; Nice, FR; (Joint Video Team of I50/IEC JTC1/SC29/WG11 and ITU-T SG16), No. JVT-Q011r1, Oct. 14 2885 (Oct. 14, 2005), pp. 1-5, XP030006175, ISSN: 0000-8413.

Xiong L., "Spatial upsampling filter," 17. JVT Meeting; 74. MPEG Meeting; Oct. 14, 2005-Oct. 21, 2005; Nice, FR; (Joint Video Team of ISO/IEC JTC1/SC29/WG11 and ITU-T SG.16), [Online] No. JVT-Q051, Oct. 11, 2005, 6 pages, XP030006212.

Chen J., et al., "On phase alignment of up-sampling process in SHVC", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-O0215, pp. 1-4, Oct. 15, 2013, XP030115264.

Dong J, et al., "Downsampling filter for anchor generation for scalable extensions of HEVC," m23485, 99th MPEG meeting, San Jose, USA, Feb. 2012, 6 pages.

Li X., et al., "SCE1: Summary Report of SHVC Core Experiment on support for additional re-sampling phase shifts," JCTVC 14th meeting; Jul. 25-Aug. 2, 2013; Vienna; (Joint Collaborative Team on Video Coding of ISO/IEC JTC1/SC29/WG11 and ITU-T SG.16); Document JCTVC-N0031, 2013, 7 pages.

Li X., et al., Common SHM test conditions and software reference configurations, JCTVC 14th meeting; Jul. 25-Aug. 2, 2013; Vienna; (Joint Collaborative Team on Video Coding of ISO/IEC JTC1/SC29/WG11 and ITU-T SG.16); Document JCTVC-N1009, 2013, 5 pages.

* cited by examiner

ADAPTIVE UPSAMPLING FILTERS

CROSS REFERENCE TO RELATED APPLICATIONS

This application claims benefit to U.S. Provisional Patent Application No. 61/657,516 entitled "ADAPTIVE UPSAMPLING FILTERS" filed on Jun. 8, 2012, and U.S. Provisional Patent Application No. 61/707,127 entitled "ADAPTIVE UPSAMPLING FILTERS" filed on Sep. 28, 2012; the disclosures of these applications are hereby incorporated by reference in their entirety.

TECHNICAL FIELD

This disclosure generally relates to video coding, including encoding and decoding of video content.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information.

Video compression techniques can perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

SUMMARY

For purposes of summarizing the disclosure, certain aspects, advantages and novel features have been described herein. It is to be understood that not necessarily all such advantages can be achieved in accordance with any particular embodiment disclosed herein. Thus, the features disclosed herein can be embodied or carried out in a manner that achieves or optimizes one advantage or group of advantages as taught herein without necessarily achieving other advantages as can be taught or suggested herein.

In accordance with some embodiments, a video coder for coding video data includes a processor and a memory. The processor can be configured to: select a filter set from a plurality of filter sets for upsampling first layer video data based at least on a prediction operation mode for second layer video data, some of the plurality of filter sets having some different filter characteristics from one another, upsample the first layer video data using the selected filter set, the upsampled first layer video data having the same spatial resolution as the second layer video data, and code the second layer video data based at least on the upsampled first layer video data and the prediction operation mode. The memory can be configured to store the upsampled first layer video data.

The video coder of the previous paragraph can include one or more of the following features: The processor can be configured to select the filter set according to whether the prediction operation mode comprises at least one of an intra-prediction mode, an inter-prediction mode, an intra residual prediction mode, an inter residual prediction mode, or a texture base layer mode. The processor can be configured to select a first filter set as the selected filter set when the prediction operation mode is an intra-prediction mode, and to select a second filter set different than the first filter set as the selected filter set when the prediction operation mode is an inter-prediction mode. The processor can be configured to select the filter set based at least on video data previously coded by the processor. The second layer video data can include a second layer block, slice, or picture. The processor can be configured to determine a phase shift from one or more syntax elements or headers of the first or second layer video data or based at least on video data previously coded by the processor; and select a filter from the selected filter set for upsampling the first layer video data based at least on the determined phase shift and a spatial aspect ratio between the first layer video data and the second layer video data. The processor can be configured to determine a displacement distance based at least on one or more syntax elements or headers of the first or second layer video data or on video data previously coded by the processor; and shift the upsampled first layer video data in a pixel domain relative to the second layer video data according to the determined displacement distance before coding the second layer video data. The processor can be configured to select the filter set based at least on a block size of the second layer video data. The different filter characteristics can include one or more of: a different filter length, a different filter output sharpness, or a different filter output smoothness. The processor can include a decoder. The processor can include an encoder. The first layer video data can include a first view video data, and the second layer video data can include a second view video data.

In accordance with some embodiments, a method of coding video data can include: selecting a filter set from a plurality of filter sets for upsampling first layer video data based at least on a prediction operation mode for second layer video data, some of the plurality of filter sets having some different filter characteristics from one another; upsampling the first layer video data using the selected filter set, the upsampled first layer video data having the same spatial resolution as the second layer video data; and coding the second layer video data based at least on the upsampled first layer video data and the prediction operation mode.

The method of the previous paragraph can include one or more of the following features: The method can further include selecting the filter set according to whether the prediction operation mode comprises at least one of an intra-prediction mode, an inter-prediction mode, an intra residual prediction mode, an inter residual prediction mode, or a texture base layer mode. The method can further include selecting a first filter set as the selected filter set when the prediction operation mode is an intra-prediction mode, and selecting a second filter set different than the first filter set as the selected filter set when the prediction operation mode is an inter-prediction mode. The method can further include selecting the filter set based at least on previously coded video data. The second layer video data can include comprise a second layer block, slice, or picture. The method can include: determining a phase shift from one or more syntax elements or headers of the first or second layer video data or based at least on previously coded video data; and selecting a filter from the selected filter set for upsampling the first layer video data based at least on the determined phase shift and a spatial aspect ratio between the first layer video data and the second layer video data. The method can further include: determining a displacement distance based at least on one or more syntax elements or headers of the first or second layer video data or on previously coded video data; and shifting the upsampled first layer video data in a pixel domain relative to the second layer video data according to the determined displacement distance before coding the second layer video data. The method can further include selecting the filter set based at least on a block size of the second layer video data. The different filter characteristics can include one or more of: a different filter length, a different filter output sharpness, or a different filter output smoothness. The method can further include receiving a syntax element extracted from an encoded video bit stream, the syntax element comprising an indication of the prediction operation mode. The method can further include generating a syntax element for an encoded video bit stream based at least on the prediction operation mode. The first layer video data can include a first view video data, and the second layer video data can include a second view video data.

In accordance with some embodiments, a video coder can include: means for selecting a filter set from a plurality of filter sets for upsampling first layer video data based at least on a prediction operation mode for second layer video data, some of the plurality of filter sets having some different filter characteristics from one another; means for upsampling the first layer video data using the selected filter set, the upsampled first layer video data having the same spatial resolution as the second layer video data; and means for coding the second layer video data based at least on the upsampled first layer video data and the prediction operation mode.

In accordance with some embodiments, a non-transitory computer storage that stores executable program instructions that direct a video coder for coding video data to perform a process that can include: selecting a filter set from a plurality of filter sets for upsampling first layer video data based at least on a prediction operation mode for second layer video data, some of the plurality of filter sets having some different filter characteristics from one another; upsampling the first layer video data using the selected filter set, the upsampled first layer video data having the same spatial resolution as the second layer video data; and coding the second layer video data based at least on the upsampled first layer video data and the prediction operation mode.

In accordance with some embodiments, a video coder for coding video data includes a processor and a memory. The processor can be configured to: select a filter from a filter set for upsampling first layer video data based at least on a phase shift and a spatial aspect ratio between the first layer video data and second layer video data, upsample the first layer video data using the selected filter, the upsampled first layer video data having the same spatial resolution as the second layer video data, and code the second layer video data based at least on the upsampled first layer video data. The memory can be configured to store the upsampled first layer video data.

The video coder of the previous paragraph can include one or more of the following features: The processor can be configured to select the filter based at least on a comparison between the phase shift and a phase determined based at least on the spatial aspect ratio between the first layer video data and the second layer video data. The processor can be configured to determine the phase shift from one or more syntax elements or headers of the first or second layer video data. The processor can be configured to determine the phase shift based at least on video data previously coded by the processor. The first layer video data can include a first layer block, slice, or picture. The processor can include a decoder. The processor can include an encoder. The first layer video data can include a first view video data, and the second layer video data can include a second view video data.

In accordance with some embodiments, a method of coding video data can include: selecting a filter from a filter set for upsampling first layer video data based at least on a phase shift and a spatial aspect ratio between the first layer video data and second layer video data; upsampling the first layer video data using the selected filter, the upsampled first layer video data having the same spatial resolution as the second layer video data; and coding the second layer video data based at least on the upsampled first layer video data.

The method of the previous paragraph can include one or more of the following features: The method can include selecting the filter based at least on a comparison between the phase shift and a phase determined based at least on the spatial aspect ratio between the first layer video data and the second layer video data. The method can include determining the phase shift from one or more syntax elements or headers of the first or second layer video data. The method can further include determining the phase shift based at least on previously coded video data. The first layer video data can include a first layer block, slice, or picture. The method can further include receiving a syntax element extracted from an encoded video bit stream, the syntax element comprising an indication of the phase shift. The method can further include generating a syntax element for an encoded video bit stream based at least on the phase shift. The first layer video data can include a first view video data, and the second layer video data can include a second view video data.

In accordance with some embodiments, a video coder for coding video data can include: means for selecting a filter from a filter set for upsampling first layer video data based at least on a phase shift and a spatial aspect ratio between the first layer video data and second layer video data; means for upsampling the first layer video data using the selected filter, the upsampled first layer video data having the same spatial resolution as the second layer video data; and means for coding the second layer video data based at least on the upsampled first layer video data.

In accordance with some embodiments, a non-transitory computer storage that stores executable program instructions that direct a video coder for coding video data to perform a process that can include: selecting a filter from a filter set for upsampling first layer video data based at least on a phase shift and a spatial aspect ratio between the first layer video data and second layer video data; upsampling the first layer video data using the selected filter, the upsampled first layer video data having the same spatial resolution as the second layer video data; and coding the second layer video data based at least on the upsampled first layer video data.

In accordance with some embodiments, a video coder for coding video data includes a processor and a memory. The processor can be configured to: upsample first layer video data using a filter, the upsampled first layer video data having the same spatial resolution as second layer video data, shift the upsampled first layer video data in a pixel domain relative to the second layer video data, and code the second layer video data based at least on the shifted, upsampled first layer video data. The memory can be configured to store the shifted, upsampled first layer video data.

The video coder of the previous paragraph can include one or more of the following features: The processor can be configured to shift the upsampled first layer video data in a vertical direction and a horizontal direction in the pixel domain relative to the second layer video data. The processor can be configured to shift the upsampled first layer video data in three or more dimensions in the pixel domain relative to the second layer video data. The processor can be configured to determine a displacement distance from one or more syntax elements or headers of the first or second layer video data, and to shift the upsampled first layer video data in the pixel domain relative to the second layer video data according to the determined displacement distance. The processor can be configured to determine a displacement distance based at least on video data previously coded by the processor, and to shift the upsampled first layer video data in the pixel domain relative to the second layer video data according to the determined displacement distance. The first layer video data can include a first layer block, slice, or picture. The processor can include a decoder. The processor can include an encoder. The first layer video data can include a first view video data, and the second layer video data can include a second view video data.

In accordance with some embodiments, a method of coding video data can include: upsampling first layer video data using a filter, the upsampled first layer video data having the same spatial resolution as second layer video data; shifting the upsampled first layer video data in a pixel domain relative to the second layer video data; and coding the second layer video data based at least on the shifted, upsampled first layer video data.

The method of the previous paragraph can include one or more of the following features: The method can further include shifting the upsampled first layer video data in a vertical direction and a horizontal direction in the pixel domain relative to the second layer video data. The method can further include shifting the upsampled first layer video data in three or more dimensions in the pixel domain relative to the second layer video data. The method can further include determining a displacement distance from one or more syntax elements or headers of the first or second layer video data; and shifting the upsampled first layer video data in the pixel domain relative to the second layer video data according to the determined displacement distance. The method can further include determining a displacement distance based at least on previously coded video data; and shifting the upsampled first layer video data in the pixel domain relative to the second layer video data according to the determined displacement distance. The first layer video data can include a first layer block, slice, or picture. The method can further include receiving a syntax element extracted from an encoded video bit stream, the syntax element comprising an indication of a displacement distance; and shifting the upsampled first layer video data in the pixel domain relative to the second layer video data according to the indication of the displacement distance. The method can further include generating a syntax element for an encoded video bit stream based at least on a displacement distance; and shifting the upsampled first layer video data in the pixel domain relative to the second layer video data according to the displacement distance. The first layer video data can include a first view video data, and the second layer video data can include a second view video data.

In accordance with some embodiments, a video coder for coding video data can include: means for upsampling first layer video data using a filter, the upsampled first layer video data having the same spatial resolution as second layer video data; means for shifting the upsampled first layer video data in a pixel domain relative to the second layer video data; and means for coding the second layer video data based at least on the shifted, upsampled first layer video data.

In accordance with some embodiments, a non-transitory computer storage that stores executable program instructions that direct a video coder for coding video data to perform a process that can include: upsampling first layer video data using a filter, the upsampled first layer video data having the same spatial resolution as second layer video data; shifting the upsampled first layer video data in a pixel domain relative to the second layer video data; and coding the second layer video data based at least on the shifted, upsampled first layer video data.

BRIEF DESCRIPTION OF DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

DETAILED DESCRIPTION

Figure 1:
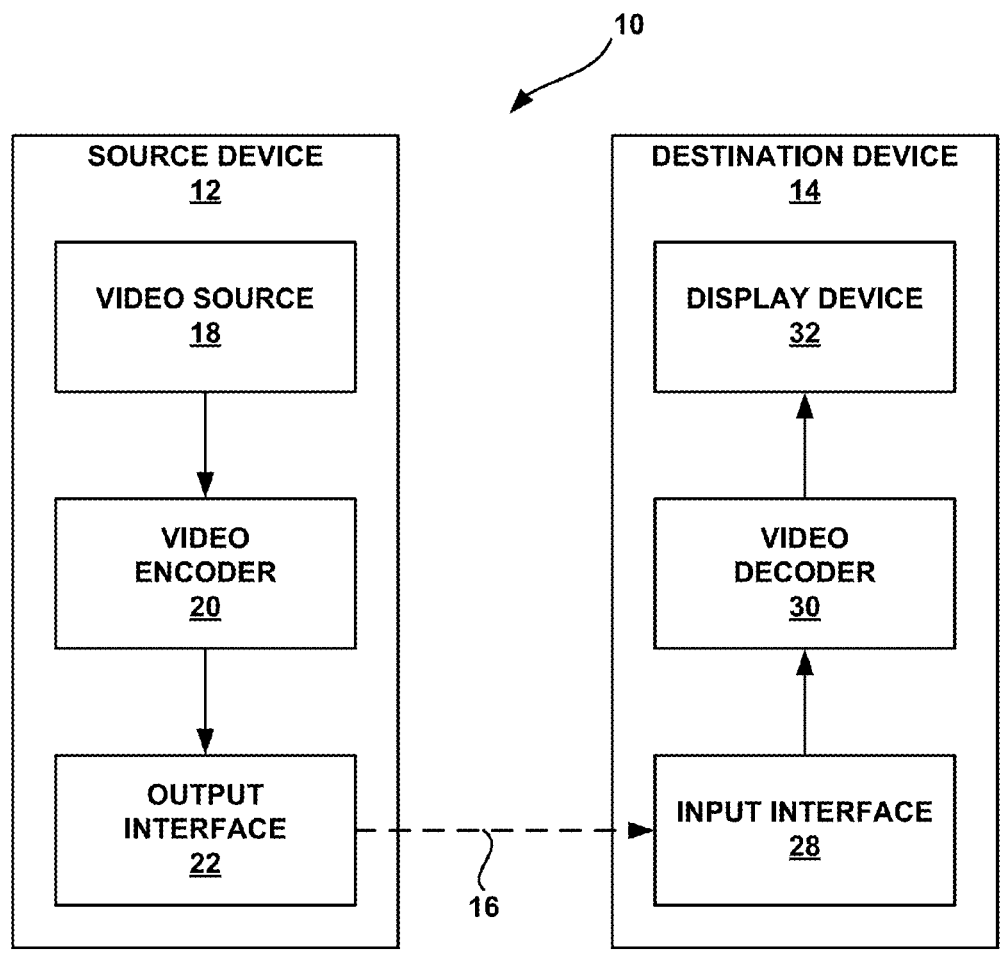
FIG. 1 is a block diagram illustrating an example video coding system that may utilize the techniques of this disclosure.

Scalable video coding (SVC) refers to video coding in which a base layer, sometimes referred to as a reference layer, and one or more scalable enhancement layers are used. For SVC, the base layer can carry video data with a base level of quality. The one or more enhancement layers can carry additional video data to support higher spatial, temporal, and/or signal-to-noise SNR levels. Enhancement layers may be defined relative to a previously encoded layer.

The base layer and enhancement layers can have different resolutions. Upsample filtering, sometimes referred to as resample filtering, may be applied to the base layer in order to match a spatial aspect ratio of an enhancement layer. This process may be called spatial scalability. An upsampling filter set can be applied to the base layer, and one filter can be chosen from the set based on a phase (sometimes referred to as a fractional pixel shift). The phase may be calculated based on the spatial aspect ratio between base layer and enhancement layer pictures.

In some systems, only one set of upsampling filters may be used for certain video data. For example, only one set of upsampling filters may be used for luma components, and only one other set of upsampling filters may be used for chroma components. Such systems unfortunately suffer from a lack of flexibility when upsampling a base layer to match a spatial aspect ratio of an enhancement layer.

In some embodiments of the present disclosure, the techniques of this disclosure increase the flexibility and performance in upsampling video data. The upsampling process advantageously can be performed in an adaptive manner by controlling or changing upsampling filters used to code video data or by shifting in the pixel domain the output of filters relative to an enhancement layer to be coded, for instance, based on enhancement layer information (e.g., a prediction operation mode, a signaling, and/or a block size of enhancement layer video data, or the like). One or more of at least three approaches can be used individually or in combination to adaptively upsample in accordance with aspects of this disclosure. First, an additional phase shift can be added to the phase calculated for upsampling filter selection. For example, multiple upsampling filters can be defined for different fractional accuracy, such as $\frac{1}{16}^{th}$ or $\frac{1}{12}^{th}$, to produce a filter set where a filter corresponds to a fractional position having a certain filter index in the filter set. For this case, the filter phase may correspond or be rounded to one of the filter indexes. Second, spatial pixel displacement can be applied to the output of an upsampling filter. Third, one or more different upsampling filter sets of a plurality of upsampling filter sets can be selectively applied.

Embodiments of this disclosure can be directed to SVC or multiview video coding (MVC). For example, the techniques may be related to, and used with or within, a High Efficiency Video Coding (HEVC) scalable video coding (SVC) extension or multiview/3D video coding (MVC) extension. In SVC, there can be multiple layers. A layer at the very bottom level or lowest level may serve as a base layer (BL) or reference layer, and the layer at the very top may serve as an enhanced layer (EL). In MVC, the term "view" may be used in place of the term "layer." Accordingly, references in this disclosure to "layer" or "layers" may be substituted with "view" or "views," respectively. Layers between the BL and EL may serve as either or both ELs or BLs. For instance, a layer may be an EL for the layers below it, such as the base layer or any intervening enhancement layers, and also serve as a BL for an enhancement layers above it. For simplicity of description, this disclosure may describe cases where there are two layers (e.g., a BL and an EL). It should be noted, however, that this disclosure applies to video coding of any number of layers or views. Moreover, although examples in this disclosure may refer to SVC, the examples may further apply to MVC.

Two standards (e.g., HEVC and H.264/AVC) may be used together or in combination, in some cases, for base or enhancement layer compression. HEVC, H.264/AVC, or another codec may be used for base layer compression, and enhancement layer compression may use HEVC, for example.

FIG. 1 is a block diagram that illustrates an example video coding system 10 that may utilize the techniques of this disclosure. As used described herein, the term "video coder" can refer to either or both video encoders and video decoders. In this disclosure, the terms "video coding" or "coding" may refer to video encoding and video decoding.

As shown in FIG. 1, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives. Destination device 14 may access the encoded video data through a standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). The HEVC standard is being developed by the Joint Collaborative Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 7" or "WD 7," is described in document JCTVC-11003, Bross et al., "High efficiency video coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012, and the entire content of which is incorporated herein by reference.

Additionally or alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard or technique. Other examples of video compression standards and techniques include MPEG-2, ITU-T H.263 and proprietary or open source compression formats such as VP8 and related formats. In some examples, base layer and enhancement layers may be coded according to different coding standards.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

FIG. 1 illustrates an example and techniques of this disclosure in video coding settings (e.g., video encoding or video decoding) that may not include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As mentioned, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (i.e., encode) the treeblocks in the slice according to a raster scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on (i.e., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block.

Video coder 20 may apply one or more transforms to residual video blocks associated with the TUs to generate transform coefficient blocks (i.e., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding can also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

In accordance with embodiments of this disclosure, video encoder 20 including an upsampling module 130 may be configured to code (e.g., encode) video data in a scalable video coding scheme that defines at least one base layer and at least one enhancement layer. Upsampling module 130 may upsample at least some video data as part of an encoding process, wherein upsampling is performed in an adaptive manner, such as by adaptively applying a phase shift in the upsampling, applying spatial changes in the upsampling, and/or applying different filter sets to achieve the upsampling as described with respect to FIGS. 6-8, for example.

Figure 2:
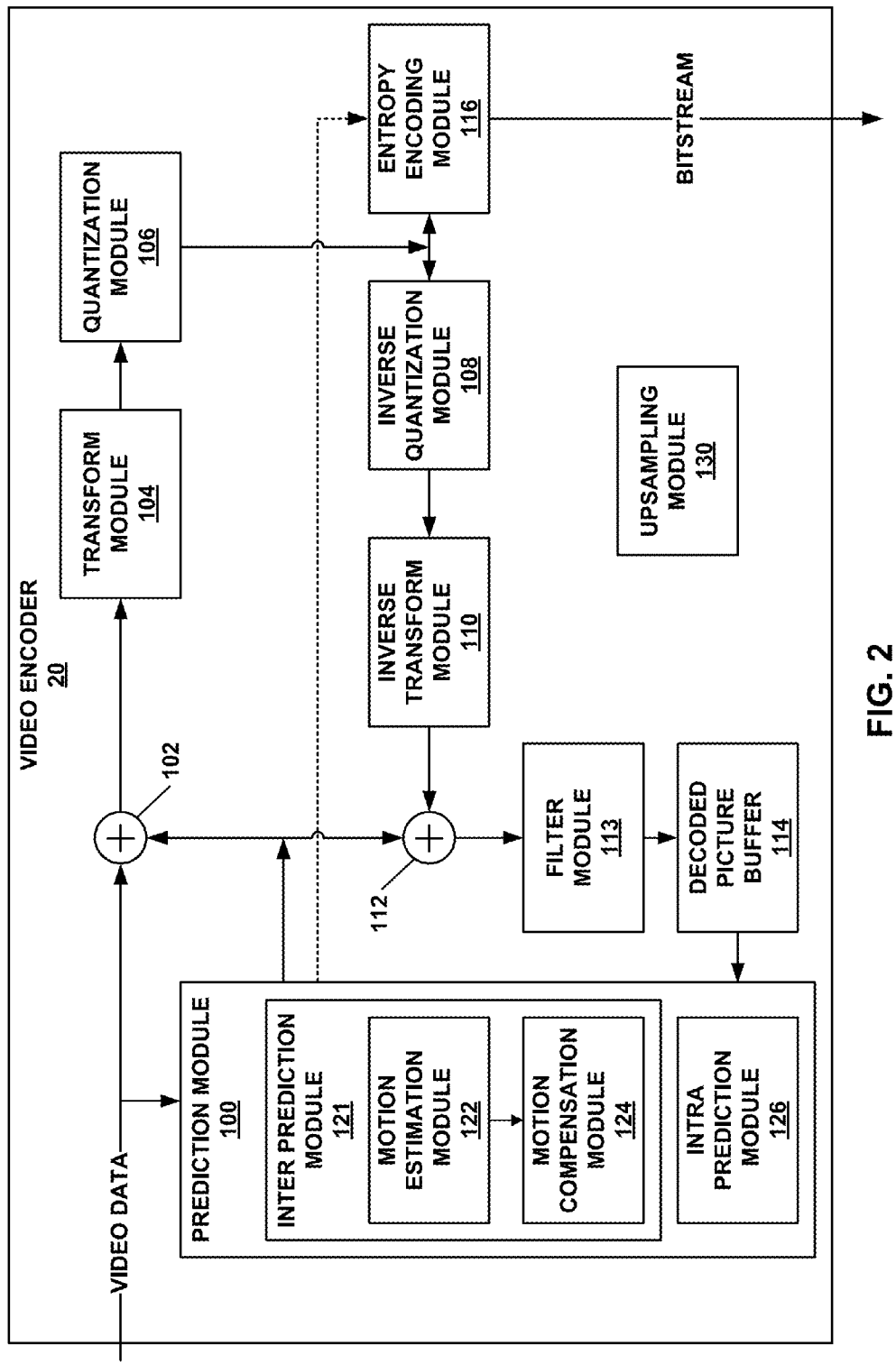
FIG. 2 is a block diagram illustrating an example video encoder that may be configured to implement the techniques of this disclosure.

FIG. 2 is a block diagram that illustrates an example video encoder 20 that can be configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes an inter prediction module 121, motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Inter prediction module 121 may perform inter prediction on each PU of the CU. Inter prediction may provide temporal compression. To perform inter prediction on a PU, motion estimation module 122 may generate motion information for the PU. Motion compensation module 124 may generate a predicted video block for the PU based the motion information and decoded samples of pictures other than the picture associated with the CU (i.e., reference pictures). In this disclosure, a predicted video block generated by motion compensation module 124 may be referred to as an inter-predicted video block.

Slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation module 122 performs the motion estimation operation with regard to a PU in a P slice, motion estimation module 122 may search the reference pictures in list 0 for a reference block for the PU. The reference block of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation module 122 may generate a reference index that indicates the reference picture in list 0 containing the reference block and a motion vector that indicates a spatial displacement between the PU and the reference block. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference block values may be interpolated from integer-position sample values in the reference picture. Motion estimation module 122 may output the reference index and the motion vector as the motion information of the PU. Motion compensation module 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference block for the PU. Motion estimation module 122 may then generate a reference index that indicates the reference picture in list 0 or list 1 that contains the reference block and a motion vector that indicates a spatial displacement between the PU and the reference block. Motion estimation module 122 may output the reference index, a prediction direction indicator, and the motion vector as the motion information of the PU. The prediction direction indicator may indicate whether the reference index indicates a reference picture in list 0 or list 1. Motion compensation module 124 may generate the predicted video block of the PU based on the reference block indicated by the motion information of the PU.

When motion estimation module 122 performs bi-directional prediction for a PU, motion estimation module 122 may search the reference pictures in list 0 for a reference block for the PU and may also search the reference pictures in list 1 for another reference block for the PU. Motion estimation module 122 may then generate reference indexes that indicate the reference pictures in list 0 and list 1 containing the reference blocks and motion vectors that indicate spatial displacements between the reference blocks and the PU. Motion estimation module 122 may output the reference indexes and the motion vectors of the PU as the motion information of the PU. Motion compensation module 124 may generate the predicted video block of the PU based on the reference blocks indicated by the motion information of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a syntax structure associated with the PU, a value that indicates to video decoder 30 that the PU has the same motion information as the neighboring PU. In another example, motion estimation module 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I slices, P slices, and B slices.

To perform intra prediction on a PU, intra prediction module 126 may use multiple intra prediction mode directions or intra prediction directions to generate multiple sets of prediction data for the PU. When intra prediction module 126 uses an intra prediction direction to generate a set of prediction data for the PU, intra prediction module 126 may extend samples from video blocks of neighboring PUs across the video block of the PU in a direction and/or gradient associated with the intra prediction direction. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction directions (e.g., 33 intra prediction directions), depending on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal a direction of the intra prediction mode that was used to generate the prediction data for the PUs (e.g., the selected intra prediction direction). Prediction module 100 may signal the selected intra prediction direction in various ways. For example, it is probable the selected intra prediction direction is the same as the intra prediction direction of a neighboring PU. In other words, the intra prediction direction of the neighboring PU may be the most probable mode for the current PU. Thus, prediction module 100 may generate a syntax element to indicate that the selected intra prediction direction is the same as the intra prediction direction of the neighboring PU.

After prediction module 100 selects the prediction data for PUs of a CU, residual generation module 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. After performing the one or more deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate estimates of probabilities of particular bins having particular values. In the context of CABAC, the term "bin" is used to refer to a bit of a binarized version of a syntax element.

Figure 3:
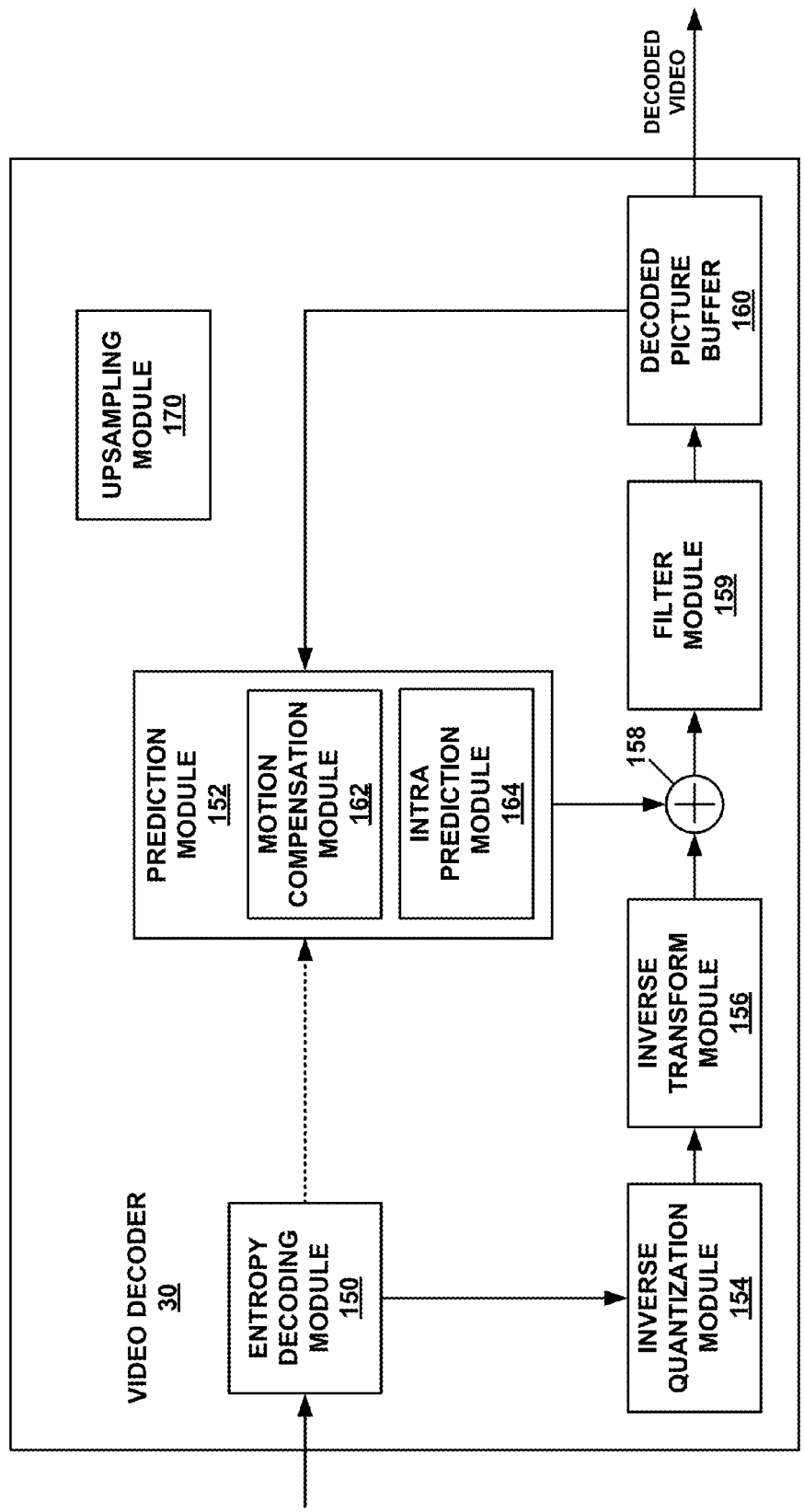
FIG. 3 is a block diagram illustrating an example video decoder that may be configured to implement the techniques of this disclosure.

FIG. 3 is a block diagram that illustrates an example video decoder 30 that can be configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In accordance with embodiments of this disclosure, video decoder 30 including an upsampling module 170 may be configured to code (e.g., decode) video data in a scalable video coding scheme that defines at least one base layer and at least one enhancement layer. Upsampling module 170 may upsample at least some video data as part of a decoding process, wherein upsampling is performed in an adaptive manner, such as by adaptively applying a phase shift or choosing a filter index in a filter set in the upsampling, applying spatial changes in the upsampling, and/or applying different filter sets to achieve the upsampling as described with respect to FIGS. 6-8, for example.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform entropy decoding operations, such as CABAC decoding operations, on syntax elements in the coded slice header to recover the slice header.

As part of extracting the slice data from coded slice NAL units, entropy decoding module 150 may perform parsing operations that extract syntax elements from coded CUs in the slice data. The extracted syntax elements may include syntax elements associated with transform coefficient blocks. Entropy decoding module 150 may then perform CABAC decoding operations on some of the syntax elements.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block.

In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

In some examples, motion compensation module 162 may refine the predicted video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predicted video block of the PU to calculate interpolated values for sub-integer samples of a reference block. Motion compensation module 162 may determine the interpolation filters used by video encoder 20 according to received syntax information and use the interpolation filters to produce the predicted video block.

If a PU is encoded using intra prediction, intra prediction module 164 may perform intra prediction to generate a predicted video block for the PU. For example, intra prediction module 164 may determine an intra prediction mode direction or intra prediction direction for the PU based on syntax elements in the bitstream. The bitstream may include syntax elements that intra prediction module 164 may use to determine the direction of the intra prediction mode of the PU.

In some instances, the syntax elements may indicate that intra prediction module 164 is to use the intra prediction direction of another PU to determine the intra prediction direction of the current PU. For example, it may be probable that the intra prediction direction of the current PU is the same as the intra prediction direction of a neighboring PU. In other words, the intra prediction direction of the neighboring PU may be the most probable mode for the current PU. Hence, in this example, the bitstream may include a small syntax element that indicates that the intra prediction direction of the PU is the same as the intra prediction direction of the neighboring PU. Intra prediction module 164 may then use the intra prediction direction to generate prediction data (e.g., predicted samples) for the PU based on the video blocks of spatially neighboring PUs.

Reconstruction module 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction module 158 reconstructs the video block of the CU, filter module 159 may perform a deblocking operation to reduce blocking artifacts associated with the CU. After filter module 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 4:
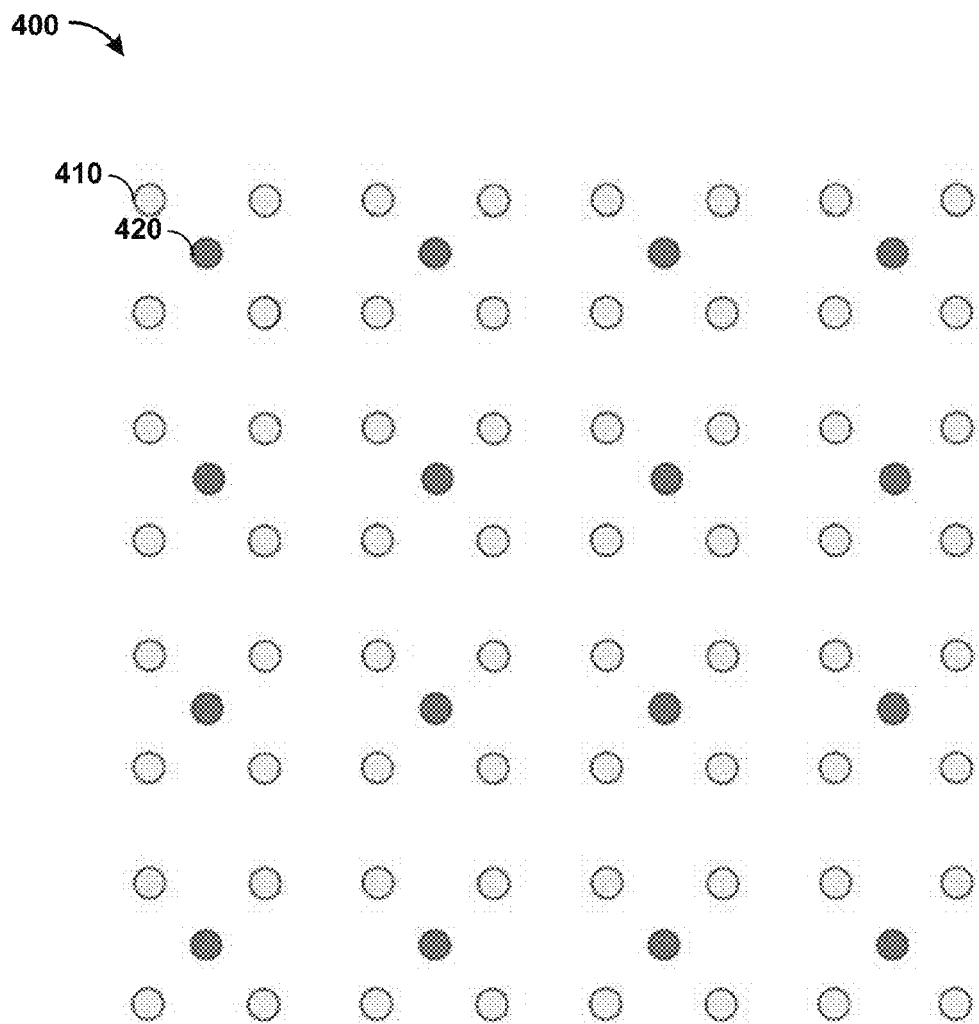
FIG. 4 is a conceptual diagram showing example pixel locations of a base layer picture and an enhancement layer picture in scalable video coding (SVC) dyadic spatial scalability.

FIG. 4 is a conceptual diagram 400 showing example pixel locations of a base layer picture (grey circles, such as first grey circle 420) and an enhancement layer picture (white circles, such as first white circle 410) in SVC dyadic spatial scalability. Upsample filtering can be applied as discussed in this disclosure to the base layer in order to match a spatial aspect ratio of the enhancement layer. In the illustrated example, the fractional pixel shift between an enhancement layer picture and a base layer picture is 0.25 and 0.75. In the MPEG AVC/SVC standard, the phase may be quantized with $1/16$ accuracy, which can result in 16 filters in a filter set.

In some embodiments, a video coder, such as video encoder 20 or video decoder 30, can perform upsampling in an adaptive manner using an upsampling filter phase shift. An additional phase shift may be added to the phase calculated with a typical procedure for upsampling filter selection. For example, an additional phase shift such as $1/16$, $-1/16$ (or another phase shift) may be added. The additional phase shift can be adapted at one of several levels, such as Sequence Level, Picture level, Slice level, Tile level, LCU level, CU level, PU level, or another level. The additional phase shift value can be signaled at LCU/CU/PU level syntax or with a higher level header syntax, such as a slice header, picture parameter set, sequence parameter set, or video parameter set or the like.

The additional phase shift can be derived based on already reconstructed neighbor pixels of the enhancement layer and base layers. Additionally or alternatively, the additional phase shift can be derived from previously reconstructed base and enhancement layers frames.

The phase shift can be applied for luma color components or chroma color components, or both. The phase shift can be further applied selectively in one or more dimensions of other color coordinate systems. The phase shift may correspond to a filter having a certain filter index in a filter set.

The phase can be defined as an argument of a periodic basis function used for upsampling filter derivation. This basis may be based on a cosine. In some embodiments, the upsampling can be defined by Equation 1 as follows:

$$F(x) = \sum_{m=0}^{N-1} F(m) \cdot \sum_{k=0}^{N-1} \cos\left(\frac{\pi(m+0.5)k}{N} + \alpha(x, m, n, k)\right) \cdot \quad (1)$$

$$\cos\left(\frac{\pi(x+0.5)k}{N} + \beta(x, m, n, k)\right)$$

where x can be an upsampling pixel position or coordinate, N can be a filter tap length, α and β are introduced values. The values for α and β can be non-zero values and adapted according to the techniques of this disclosure, such as based on enhancement layer information (e.g., a prediction operation mode, a signaling, or a block size of enhancement layer video data, or the like). In some embodiments, α and β can be fixed values or can instead be functions of the coordinates, like the function of x, m and n and summation parameter k, as in the example formula. Further, in some embodiments, the basis used in the above formula can be a basis other than a cosine. In some embodiments, other definitions of the filter phase can be used.

Furthermore, the phase shift and its signaling can be applied for interpolation filters for motion compensation prediction in some embodiments.

Figure 5B:
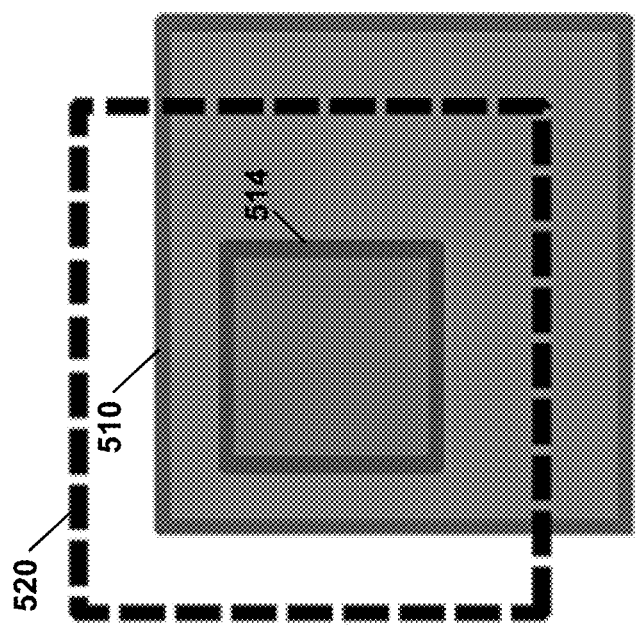
FIGS. 5A and 5B are conceptual diagrams illustrating the spatial pixel displacement of an enhancement layer relative to a base layer.
Figure 5A:
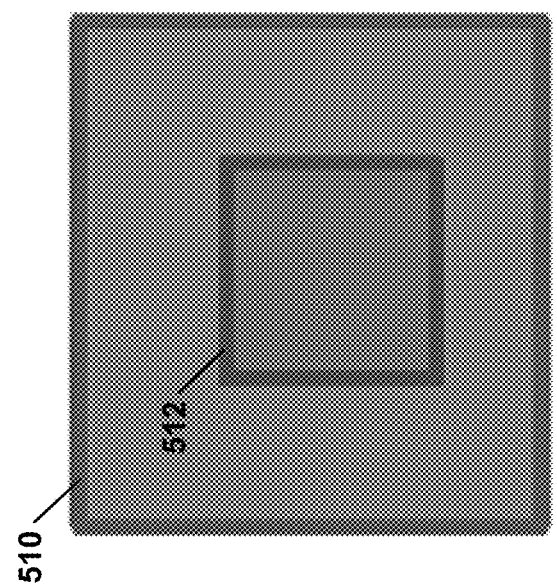

In some embodiments, a video coder, such as video encoder 20 or video decoder 30, can perform upsampling in an adaptive manner using a spatial pixel displacement. Spatial pixel displacement can be applied for an upsampling filter, such as illustrated by FIGS. 5A and 5B, which show displacement of a base layer block 510 and an enhancement layer block 520. In particular, FIGS. 5A and 5B illustrate the spatial pixel displacement of the enhancement layer. FIG. 5A shows the base layer block 510 and one highlighted base layer sub-block 512. FIG. 5B shows displacement of the enhancement layer block 520 relative to the base layer block 510 and another highlighted base layer sub-block 514.

Considering a one dimensional spatial pixel displacement example, the number of pixels used in the upsampling can be dependent on the filter tap length, and in the case of an 8-tap filter, the following pixels with coordinates {−4, −3, −2, −1, 0, 1, 2, 3} relative to the block edge can be used. In some embodiments, due to different resolutions of the base and enhancement layers, the BL and EL blocks can be displaced against each other. As a result, the pixel displacement may be advantageously applied to the output of the upsampling filter. For example, the pixel displacements of +1 or −1 can be used. For the pixel displacement of +1, for instance, the following pixel coordinates in one dimension can be used {−3, −2, −1, 0, 1, 2, 3, 4}. In two-dimensional embodiments, displacement can be done in either or both the vertical or horizontal directions. Further, in some embodiments, displacement can be extended to three or more dimensions or for a fraction of a pixel, such as half pixel or quarter pixel displacement.

The pixel displacement can be derived based on already reconstructed neighbor pixels of the enhancement layer and the base layer. Additionally or alternatively, the pixel displacement can be derived based on previously reconstructed base and enhancement layer frames. The pixel displacement can be signaled at a largest coding unit (LCU) level, a coding unit (CU) level, a prediction unit (PU) level, a header (such as a slice, a picture, and sequence header, or the like), or a video parameter set. The displacement can be applied for either or both luma or chroma color components.

Furthermore, the displacement techniques and its signaling as described in this disclosure can be applied for interpolation filters for motion compensation prediction.

In some embodiments, a video coder, such as video encoder 20 or video decoder 30, can perform upsampling in an adaptive manner using upsampling filter adaptation such that one set of multiple sets of upsampling filters with different characteristics (e.g., different smoothness, sharpness, or length) can be selectively applied. A selected or applied upsampling filter set may depend on a prediction operation mode of a video block, picture, or slice, for instance. In such cases, a different set of upsampling filters can be applied for each prediction operation mode or one or more groups of prediction operation modes. For example, for the intra-prediction prediction operation mode, the set of filters may include one or more 8-tap filters while the set of filters for the difference prediction operation mode may include one or more 4-tap filters. Advantageously, an 8-tap filter can be used for intra-prediction mode to enable increased sharpness or smoothness over shorter filters in upsampling of video data that contains relatively detailed information, such as intra-prediction coded data. Further, a shorter 4-tap filter can be used for difference prediction operation mode to enable reduced memory usage over longer filters in upsampling of video data that contains relatively less detailed information, such as difference coded data.

The coefficients that define multiple sets of upsampling filters can be fixed and hard-coded in the system or the coefficients can be derived (e.g., "on-the-fly") according to coded content, for example. The coefficients filter sets can be signaled at LCU/CU/PU level syntax, headers (such as slice, picture, and sequence headers or the like), or video parameter sets. Further, a filter set index may be signaled at LCU/CU/PU level syntax, headers (such as slice, picture, and sequence headers or the like), or video parameter sets to indicate the filter set used for one or more corresponding upsampling processes.

Additionally or alternatively, the filter set used for base layer upsampling can be chosen adaptively according to an EL prediction mode. The filter set can be different for texture BL mode, difference domain intra prediction mode, and difference domain inter prediction mode, in some embodiments. Texture BL mode may refer to the mode when the BL reconstruction may be used as a predictor for the enhancement layer, and difference domain prediction mode may refer to the mode when the difference between reconstructed base layer and EL original data may be predicted.

In some embodiments, the filter set used can be derived based on already reconstructed neighbor pixels of the enhancement layer and/or neighboring or co-located pixels of the base layer. Further, the filter set can be derived based on previously reconstructed base and/or enhancement layers frames.

In some embodiments, the filter set can be chosen according to corresponding content statistics. One example is that a longer filter may be preferred in smooth regions while a shorter filter may be preferred if the filter is used across strong edges. Long filter crossing a strong edge can produce echoes of the edge (ringing artifacts), which can hurt compression and/or quality. Accordingly, in some embodiments, multiple sets of upsampling filters with different lengths can advantageously be applied (e.g., depending on the content of the video data being filtered). Moreover, the filter set used can be derived to the edge statistics of a corresponding area in a base layer picture.

In some cases, different filter sets can be applied for either or both luma or chroma color components. Furthermore, the filter sets and corresponding derivation can be applied for interpolation filters for motion compensation prediction.

In some embodiments, a phase shift as used in this disclosure can refer to a filter phase shift where filter coefficients are associated with the phase shift. Changing a filter phase or applying a different phase shift to a current phase may lead to a change in filter coefficients. A filter phase may further be associated with a filter index in a filter set.

Figure 6:
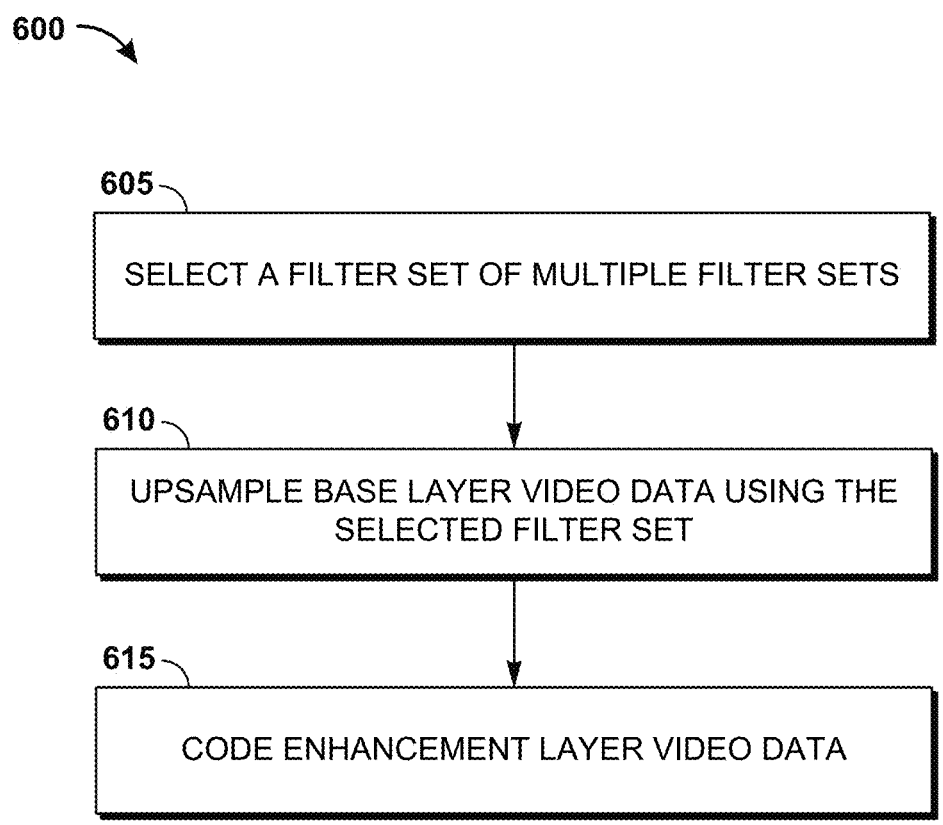
FIGS. 6-8 illustrate example methods for coding video data.

FIG. 6 illustrates an example method 600 for coding video data. The method 600 can be performed by one or more components of video encoder 20 or video decoder 30, including upsampling module 130 or upsampling module 170. In some embodiments, other components may be used to implement one or more of the steps described herein.

At node 605, one or more filter sets of multiple filter sets are selected for upsampling base layer video data based at least on a prediction operation mode for enhancement layer video data. Some of the multiple filter sets may have some different filter characteristics from one another. At node 610, the base layer video data is upsampled using the selected filter set. The upsampled base layer video data can have the same spatial resolution as the enhancement layer video data. At node 615, the enhancement layer video data is coded based at least on the upsampled base layer video data and the prediction operation mode.

Figure 7:
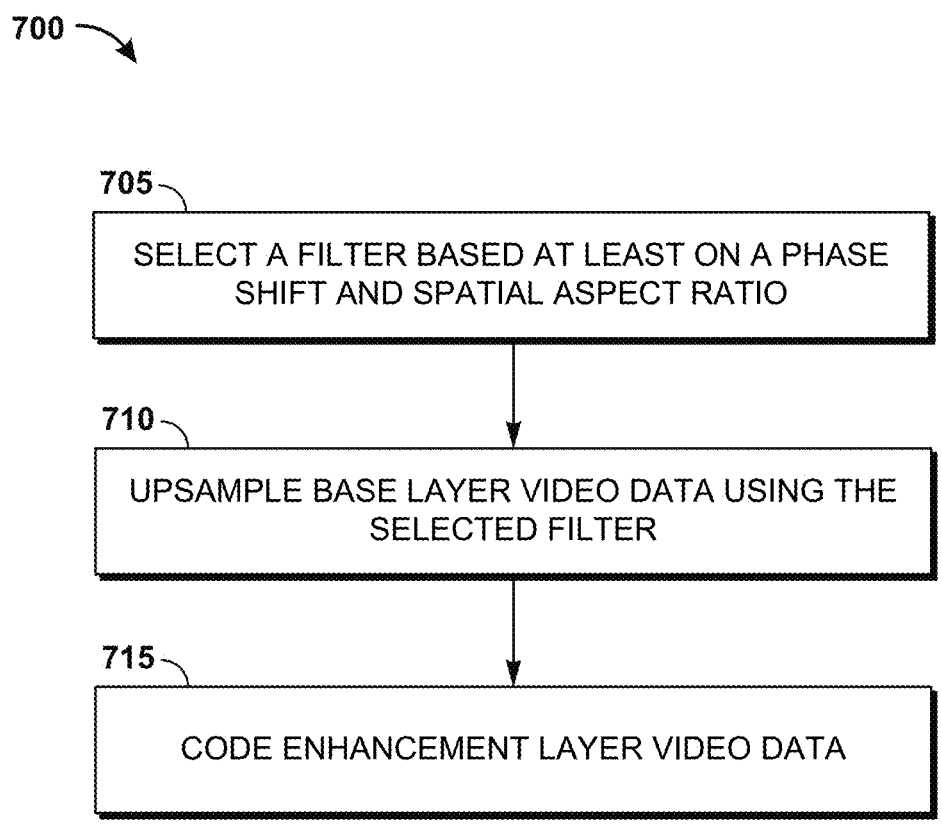

FIG. 7 illustrates an example method 700 for coding video data. The method 700 can be performed by one or more components of video encoder 20 or video decoder 30, including upsampling module 130 or upsampling module 170. In some embodiments, other components may be used to implement one or more of the steps described herein.

At node 705, a filter is selected from a filter set based at least on a phase shift and a spatial aspect ratio between base layer video data and enhancement layer video data. At node 710, the base layer video data is upsampled using the selected filter. The upsampled base layer video data can have the same spatial resolution as the enhancement layer video data. At node 715, the enhancement layer video data can be coded based at least on the upsampled base layer video data.

Figure 8:
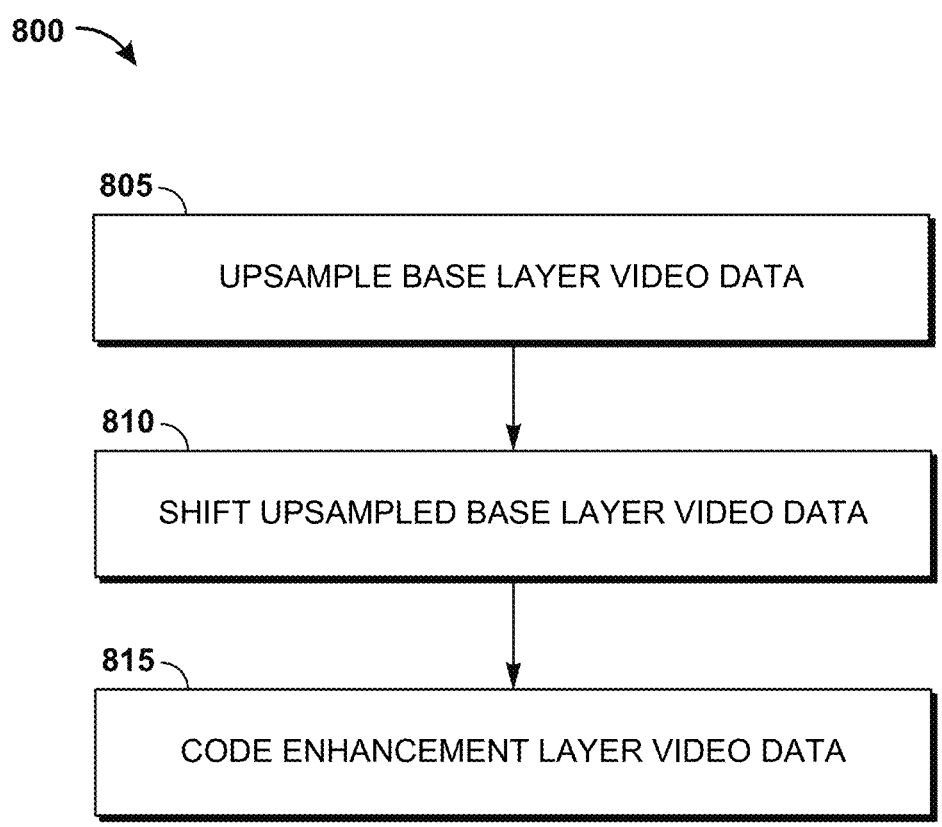

FIG. 8 illustrates an example method 800 for coding video data. The method 800 can be performed by one or more components of video encoder 20 or video decoder 30, including upsampling module 130 or upsampling module 170. In some embodiments, other components may be used to implement one or more of the steps described herein.

At node 805, base layer video data is upsampled using a filter. The upsampled base layer video data can have the same spatial resolution as enhancement layer video data. At node 810, the upsampled base layer video data is shifted in the pixel domain relative to the enhancement layer video data. At node 815, the enhancement layer video data is coded based at least on the shifted, upsampled base layer video data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques can be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In still other examples, this disclosure may be directed to a computer readable medium that stored compressed video content, wherein the video content is compressed according to one or more of the techniques described herein.

Various examples have been described. These and other examples are within the scope of the following claims.

What is claimed is:

1. A video coder for coding video data, the video coder comprising:
   a processor configured to:
   determine a phase shift between first layer video data and second layer video data from one or more syntax elements or one or more headers of the first layer video data or the second layer video data, select a filter from a filter set for upsampling the first layer video data based on (1) the determined phase shift and (2) a phase calculated based on a spatial aspect ratio between the first layer video data and the second layer video data, upsample the first layer video data using the selected filter, the upsampled first layer video data having the same spatial resolution as the second layer video data, and code the second layer video data based at least on the upsampled first layer video data; and a memory in communication with the processor, the memory configured to store the upsampled first layer video data.

2. The video coder of claim 1, wherein the processor is configured to select the filter based on a sum of the determined phase shift and the phase.

3. The video coder of claim 1, wherein the processor is configured to determine the phase shift for luma color component data.

4. The video coder of claim 1, wherein the processor is configured to determine the phase shift for chroma color component data.

5. The video coder of claim 1, wherein the processor is configured to determine the phase shift for luma color component data and chroma color component data.

6. The video coder of claim 1, wherein the processor is configured to determine if the phase shift comprises −1/16 or 1/16.

7. The video coder of claim 1, wherein the processor is configured to determine the phase shift from a picture header.

8. The video coder of claim 1, wherein the first layer video data comprises a first layer block, slice, or picture.

9. The video coder of claim 1, wherein the processor comprises a decoder.

10. The video coder of claim 1, wherein the processor comprises an encoder.

11. The video coder of claim 1, wherein the video coder is part of a device, the device selected from the group consisting of a desktop computer, a notebook computer, a tablet computer, a set-top box, a telephone handset, a television, a camera, a display device, a digital media player, a video gaming console, and a video streaming device.

12. A method of coding video data, the method comprising:
under the control of an electronic processor in communication with a memory unit:
determining a phase shift between first layer video data and second layer video data from one or more syntax elements or one or more headers of the first layer video data or the second layer video data;
selecting a filter from a filter set for upsampling the first layer video data based on (1) the determined phase shift and (2) a phase calculated based on a spatial aspect ratio between the first layer video data and the second layer video data;
upsampling the first layer video data using the selected filter, the upsampled first layer video data having the same spatial resolution as the second layer video data;
coding the second layer video data based at least on the upsampled first layer video data; and
storing the up sampled first layer video data in the memory unit.

13. The method of claim 12, further comprising selecting the filter based on a sum of the determined phase shift and the phase.

14. The method of claim 12, wherein the determining the phase shift comprises determining the phase shift for luma color component data.

15. The method of claim 12, wherein the determining the phase shift comprises determining the phase shift for chroma color component data.

16. The method of claim 12, wherein the determining the phase shift comprises determining the phase shift for luma color component data and chroma color component data.

17. The method of claim 12, wherein the determining the phase shift comprises determining if the phase shift comprises −1/16 or 1/16.

18. The method of claim 12, wherein the determining the phase shift comprises determining the phase shift from a picture header.

19. The method of claim 12, wherein the first layer video data comprises a first layer block, slice, or picture.

20. The method of claim 12, further comprising receiving a syntax element extracted from an encoded video bit stream, the syntax element comprising an indication of the phase shift.

21. The method of claim 12, further comprising generating a syntax element for an encoded video bit stream based at least on the phase shift.

22. A video coder for coding video data, the video coder comprising:
means for determining a phase shift between first layer video data and second layer video data from one or more syntax elements or one or more headers of the first layer video data or the second layer video data;
means for selecting a filter from a filter set for upsampling the first layer video data based on (1) the determined phase shift and (2) a phase calculated based on a spatial aspect ratio between the first layer video data and the second layer video data;
means for upsampling the first layer video data using the selected filter, the upsampled first layer video data having the same spatial resolution as the second layer video data;
means for storing the upsampled first layer video data; and
means for coding the second layer video data based at least on the upsampled first layer video data.

23. The video coder of claim 22, wherein the means for selecting is configured to select the filter based on a sum of the determined phase shift and the phase.

24. The video coder of claim 22, wherein the means for determining is configured to determine the phase shift for luma color component data.

25. The video coder of claim 22, wherein the means for determining is configured to determine the phase shift for chroma color component data.

26. The video coder of claim 22, wherein the means for determining is configured to determine the phase shift from a picture header.

27. The video coder of claim 22, wherein the first layer video data comprises a first layer block, slice, or picture.

28. A non-transitory computer storage that stores executable program instructions that direct a video coder for coding video data to perform a process that comprises:
determining a phase shift between first layer video data and second layer video data from one or more syntax elements or one or more headers of the first layer video data or the second layer video data;
selecting a filter from a filter set for upsampling the first layer video data based on (1) the determined phase shift and (2) a phase calculated based on a spatial aspect ratio between the first layer video data and the second layer video data;

upsampling the first layer video data using the selected filter, the upsampled first layer video data having the same spatial resolution as the second layer video data; and coding the second layer video data based at least on the upsampled first layer video data.

29. The non-transitory computer storage of claim 28, wherein the process further comprises selecting the filter based on a sum of the determined phase shift and the phase.

30. The non-transitory computer storage of claim 28, wherein the determining the phase shift comprises determining the phase shift for luma color component data.

31. The non-transitory computer storage of claim 28, wherein the determining the phase shift comprises determining the phase shift for chroma color component data.

32. The non-transitory computer storage of claim 28, wherein the determining the phase shift comprises determining the phase shift from a picture header.

33. The non-transitory computer storage of claim 28, wherein the first layer video data comprises a first layer block, slice, or picture.

* * * * *